April 14, 1970 IKUJI KATO 3,506,346

MOTION PICTURE FILM CARTRIDGE

Filed April 21, 1967

INVENTOR.

BY Ikuji Kato

Burgess, Ryan & Hicks,
ATTYS.

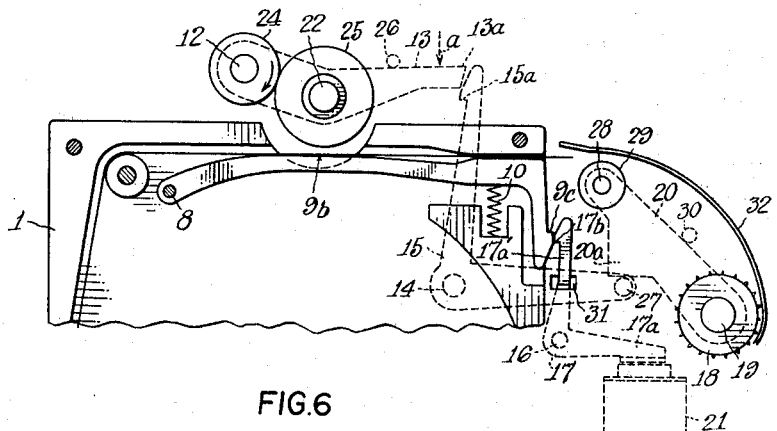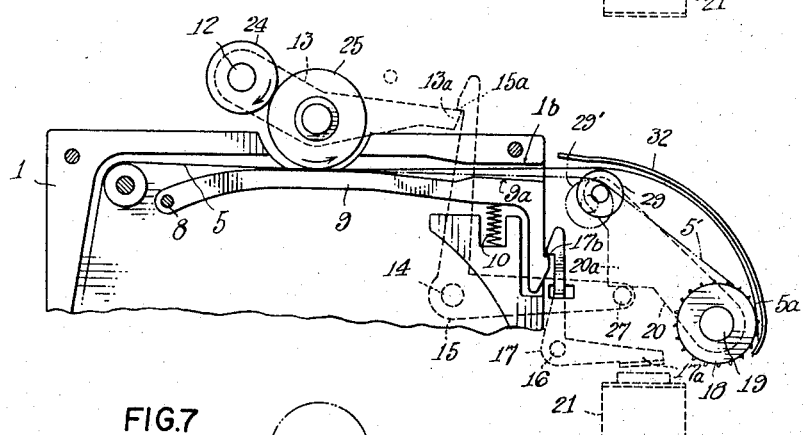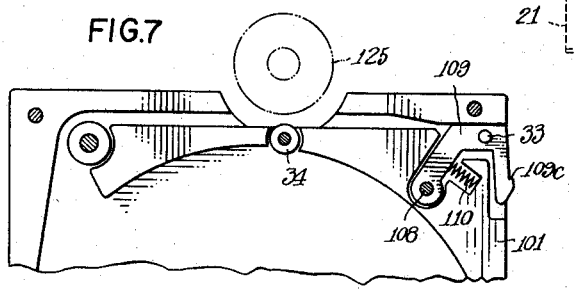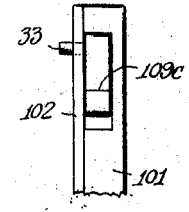

United States Patent Office 3,506,346
Patented Apr. 14, 1970

3,506,346
MOTION PICTURE FILM CARTRIDGE
Ikuji Kato, Tokyo, Japan, assignor to Ricoh Kabushiki
Kaisha, Tokyo, Japan, a corporation of Japan
Filed Apr. 21, 1967, Ser. No. 632,677
Claims priority, application Japan, Apr. 25, 1966,
41/26,215
Int. Cl. G03b 23/02
U.S. Cl. 352—72                                        5 Claims

ABSTRACT OF THE DISCLOSURE

A film cartridge having a film loading shaft is connectable with a film rewinding shaft of a motion picture projector. A stopper member holds the leading edge of the film within the film path in the cartridge body. A notch is provided through which a portion of the film lying in the above path is exposed to the outside of the cartridge body. A hook is employed for holding the stopper member in film released position when pressed by a friction drive wheel entering the notch. The film is advanced by the wheel toward a rotatable film sprocket wheel which engages the film and withdraws more film from the cartridge.

BACKGROUND OF THE INVENTION

This invention relates to a film loading cartridge housing a motion picture film. A movie projector wherein a motion picture film provided on a film supply reel can be automatically set by simply inserting one end thereof into a film insertion mouth which is suitably provided in said movie projector is well known in the art. With the known movie projectors, however, insertion of the film end into the film insertion mouth requires manual operation.

SUMMARY

It is an object of this invention to provide a motion picture film loading cartridge wherein insertion of one end of the motion picture film into a film insertion mouth can be automatically performed. It is characterized in that a stopper member which stops the movement of a film loaded in a cartridge is provided in the film travelling path formed in said film cartridge so that the outer end of the film roll loaded in said cartridge is prevented from being drawn in the cartridge.

BRIEF DESCRIPTION OF THE ACCOMPANYING DRAWINGS

FIGS. 5 and 6 are partial side views of the above embodiment mounted on a movie projector, with FIG. 6 illustrating a film strip being fed out from such projector;

FIG. 7 is a side view of a motion picture film cartridge, showing alternative embodiment of this invention; and FIG. 8 is a front view of the structure shown in FIG. 7.

Figure 1:
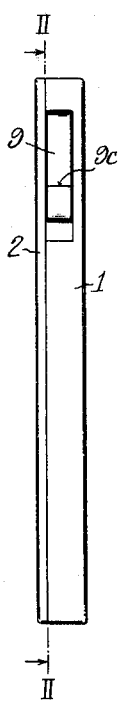
FIG. 1 is a front view of a motion picture film loading cartridge constructed in accordance with a preferred embodiment of this invention.

With these and other objects in view which will become apparent in the following detailed description, the present invention will be clearly understood in connection with the accompanying drawings, in which:

1 represents a main body of a motion picture film loading cartridge constructed in accordance with a preferred embodiment of the present invention. 2 is a side plate secured at four corners on said cartridge 1 by studs 3. 5 shows a movie photographic film installed within a space 4 which is formed by the cartridge body 1 and the side plate 2.

The inner end of a loaded film roll is suitably secured on the circumference 6a of a film loading spool 6 (Refer FIGS. 2 and 3) rotatably supported by and between said cartridge body 1 and the side parts 2. The cartridge is constructed such that, when it is mounted on a movie projector, a hollow opening 7 provided at the center of said film loading spool 6 is adapted to be fitted with, and thereby rendered rotatable integrally with, a film rewinding shaft of the projector.

Figure 2:
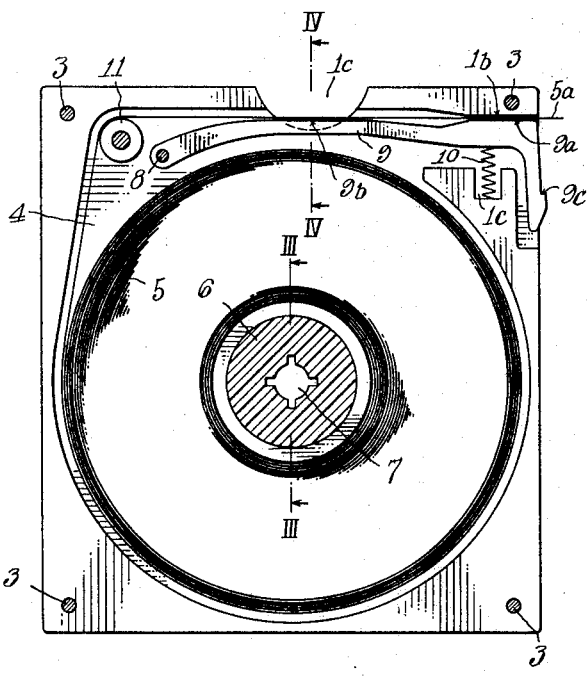
FIG. 2 is a sectional view taken along dot-and-dash lines II—II of FIG. 1.
Figure 3:
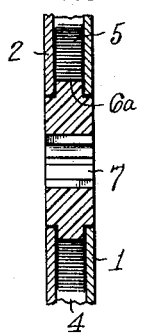
FIG. 3 is a sectional view taken along dot-and-dash lines III—III of FIG. 2.
Figure 4:
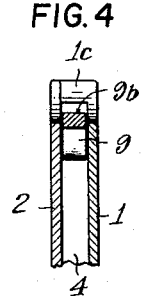
FIG. 4 is a sectional view taken along dot-and-dash lines IV—IV of FIG. 2.

Referring now to FIG. 2, in the upper portion of the aforesaid space 4 is provided a stopper member 9 which is secured, at its inner end, on the cartridge body 1 by an axis 8. The stopper member 9 is urged to rotate in a counterclockwise direction around the aforesaid axis 8 by the elastic force of an expansible spiral spring 10 which is provided in a notch 1c of said cartridge body 1, whereby the top surface 9a of the outer end of said stopper member 9 is relatively strongly pressed onto an inner surface 1b of the cartridge body 1, one end 5a of the film strips being sandwiched therebetween. Said film end 5a is pulled out from the film roll along the outer surface 9b (FIG. 4) of the stopper member 9 by a guide roller 11, said outer surface 9b being exposed to outside of the cartridge through the aforesaid notch 1c. The stopper member is further provided with a hook 9c formed at its outer front face.

The cartridge constructed as described above is adapted to be firmly positioned on a movie projector by means of holders provided on the latter.

FIGS. 5 and 6 show such cartridge mounted on the side plate of a movie projector. On the reverse side of said side plate are provided a rotatable oscillating lever 13 mounted on a revolvable shaft 12, a bell crank 15 fixed on the side plate by a shaft 14, a hook stopper member 17 secured on the side plate by a shaft 16, a rotatable oscillating arm 20 secured on an axis 19 of a sprocket wheel 18, and an electromagnet 21 which suitably attracts an arm 17a of said hook stopper member 17. The aforesaid oscillating lever 13 carries a fixed axis 22 which extends out of the surface of the side plate through a slot (not shown) provided on the side plate, said axis 22 being mounted with a rotatable friction wheel 25 which is pressed on a driving wheel 24 which is secured on the aforesaid revolvable shaft 12 and rotatable in the direction of the arrow shown in the figures.

The oscillating lever 13 is urged to rotate in a counterclockwise direction around its axis 12 by the force of a spring and is normally held, at its upper edge, in contact with a stop 26. Said oscillating lever 13 is further pushed in the direction of arrow a from outside of movie projector, whereby the lower circumference of a friction wheel 25 on the oscillating lever 13 is adapted to be pressed against the film srip which runs along the stopper member 9. An extremity 13a of the oscillating lever 13 thus turned comes into engagement with a hooked portion 15a formed at one arm end of the bell crank 15, thereby holding said oscillating lever 13 in a tilted position. On the other arm end of said bell crank 15 is fixed a pin 27 which is positioned in the proximity of an extension 20a of an oscillating arm 20. On the other end of said oscillating arm 20 is fixed a shaft 28 which extends out of the aforesaid side plate through a slot (not shown) provided therein, said shaft carrying a rotatable roller 29. The oscillating arm 20 is urged to rotate in clockwise direction around a shaft of the sprocket wheel 19 and is normally held in close contact with a stopper 30. An arm 17a' of the hook stopper member 17 extends upward from out of a hole 31 to be engaged, at its hook shape portion 17b, with a hook 9c of the stopper member 9 as said hook stopper member 17 is urged to rotate in a counterclockwise direction.

Referring now to FIG. 6, depression of the stopper member 9 by the friction wheel 25 depresses the upper surface 9a of the stopper member 9 from the inner surface 1b of the cartridge body, permitting the strip of the film held therebetween to move. The film thus released is thereupon advanced by the friction wheel 25 which rotates in the direction of the arrow shown in the figure, allowing the leading edge 5a of the film to travel along an arcuate guide plate 32 until it is caught by a sprocket wheel 18. By constructing the sprocket wheel 18 and the friction wheel 25 such that the circumferential velocity of the former is greater than the circumferential velocity of the latter, the film strip extended therebetween takes, upon engagement of its end 5a with the sprocket wheel 18, a tense or tightened position as shown in chain lines 5'. As a result, the roller 29 shifts to a position shown in dashed lines 29' (FIG. 6), causing the oscillating arm 20 to revolve in a counterclockwise direction around the sprocket wheel axis 19, whereupon the extension 20a of said oscillating arm 20 depresses the pin 27, causing the bell crank 15 to rotate clockwise around its axis 14 and to release its hook 15a from engagement with the end 13a of the oscillating lever 13, thereby restoring said oscillating lever 13 to its original position as shown in FIG. 5. The film thus disengaged from contact with the friction wheel on the oscillating lever 13 is then fed into a path of the known automatic film loading mechanism which advances said film strip to a take-up spindle.

Upon returning movement of the oscillating arm 13 as described above, the stopper member 9 is also urged to be restored to its original position by the force of a spring 10. The actual returning movement of the stopper member 9, however, does not take place as its hook 9c engages with hooked portion 17b of the hook stopper member 17.

Operation of the movie projector is adapted to be stopped as the feeding of the film housed in the cartridge nears its end. The operational movement of the movie projector can be stopped either manually after the film projection is over, or by the aid of an automatic stopper means cooperating with a measuring device which would automatically measure the time or length of the film transported during projection.

After the movie projection operation is through, the film can be rewound onto the film loading spool 6 by switching the driving mechanism in a reverse direction so as to reverse the movement of the film rewinding spool which had been revolving freely with the rotary movement of said film loading spool 6. During film rewinding operation, the film transport finger which works during projection operation is retracted from the film path and the sprocket wheel is adapted to be rendered freely rotatable, all of which operations are coupled with the reverse movement of the film rewinding shaft.

As the film rewinding operation nears its end, the driving mechanism of a movie projector is stopped and a damping force is applied to the rewinding shaft, whereupon the electromagnet 21 is activated to attract an end 17a of the hook stopper member 17 which releases the stopper member 9 from engagement therewith and restores said stopper member 9 to its original position, causing the leading edge of the film strip to be held between the inner surface 1b of the cartridge and the upper surface 9a of the stopper member 9. Stopping motion of the driving mechanism of the movie projector and the action to apply the damping force to the rewinding shaft are activated by a feeler means provided in the film path formed in the movie projector.

Instead of allowing the stopper member 9 to be depressed by the friction wheel 25 as described heretofore, said stopper member 9 can also be depressed manually as shown in an embodiment depicted in FIG. 7.

Referring now to FIG. 7, a stopper member 109, which is secured on a cartridge body 101 by an axis 108, is urged to rotate in a counterclockwise direction by the elasticity of an expansible spring 110. By operating a finger tip pin 33 which is fixed on said stopper member 109 and extends outward piercing loosely through a side plate 102, the stopper member 109 is adapted to be rotated in a clockwise direction against the force of the aforesaid spring 110, causing a hook portion 109c of the stopper member 109 to be engaged with a hook stopper member 17 (refer FIG. 6) which is provided on the side of the movie projector. The film transport in this embodiment is adapted to be performed by pressing a friction wheel 125 onto a roller 34 secured on a cartridge.

Movie projectors which can utilize a motion picture film loading cartridge of the present invention are not necessarily limited to the movie projectors whose structure is described in the accompanying drawings, so long as such movie projectors are equipped with a hook member which holds a stopper member of said cartridge in a position to keep the film path open, a friction wheel to transport the film and a mechanism which operates said stopper member and the friction wheel in conjunction with the movement of the film strip.

With the use of a film cartridge according to the present invention in which the leading edge of the film loaded in said cartridge is prevented from being rolled into the cartridge, complete automation of a film mounting process becomes feasible and projection operation becomes extremely easy. It further eliminates any possible inconvenience of film being loosened off from a film loading reel.

I claim:

1. A motion picture film loading cartridge comprising a film loading shaft connectable with a film rewinding shaft of a movie projector, a stopper member which holds the leading edge of the film within the path of the film in a cartridge body, a notch through which a portion of the film lying in said path is exposed to the outside of the cartridge body, a hook member of said projector adapted to cooperate with said stopper member to hold the latter in released position in relation to said film, and a means for moving said film from said cartridge while said stopper is in released position.

2. A motion picture film loading cartridge as described in claim 1, characterized in that a portion of a stopper member holding a film is exposed within a notch, a friction drive wheel adapted to enter said notch, engage one side of said film, press said stopper into a released position in relation to the free end of said film and move said film out of said cartridge, and a sprocket wheel in the path of said advancing free film end adapted to engage it and withdraw more film from said cartridge.

3. A motion picture film loading cartridge comprising a film loading shaft connectable with a film rewinding shaft of a motion picture projector, a stopper member adapted to hold the leading edge of the film within the film path in the cartridge body, a notch through which a portion of the film lying in said path is exposed to the outside of the cartridge body, a hook for holding said stopper member in film released position, means for advancing the free end of a film loaded in said cartridge toward a rotatable film sprocket wheel, means for releasing said hook from said stopper when the free film end is engaged on said sprocket wheel.

4. A motion picture film loading cartridge as described in claim 3, characterized in that a portion of a stopper member supporting a film is exposed within a notch, a friction wheel of said projector adapted to fit into said notch and engage the surface of said film, said friction wheel adapted to move said stopper member into non-clamping relation with the free end of the film, means for holding the stopper member in non-clamping relation with the free end of the film while the friction wheel advances the film from the cartridge over the stopper in the direction of a film sprocket wheel which is adapted to be rotated to draw the film from the cartridge, and means for tripping said holding means for the stopper when said film engages said sprocket wheel.

5. A motion picture film loading cartridge as described in claim 3, characterized in that a portion of a stopper member supporting a film is exposed within a notch adapted to receive a rotatable friction wheel to make contact with the surface of the film and advance it out of said cartridge, said friction wheel adapted to move said stopper into a non-engaging position in relation to the free end of the film, and means for holding the friction wheel in operable engagement with the film to advance the same, a film sprocket wheel adapted to receive the free end of the film and create tension in the free end of said film, and means operable through the creation of said film tension to release the friction wheel and in turn the stopper so that the latter again exercises a braking influence on movement of the film out of the cartridge, and independent means for holding the stopper in non-operable position which means may be operated independently of the tension created in the film by the sprocket wheel and independently of the position of the friction wheel.

References Cited
UNITED STATES PATENTS

| | | | |
|---|---|---|---|
| 2,427,585 | 9/1947 | Williams | 352—78 |
| 3,342,431 | 9/1967 | Mouissie | 352—78 X |

NORTON ANSHER, Primary Examiner

R. A. WINTERCORN, Assistant Examiner

U.S. Cl. X.R.

352—78